(12) United States Patent
Burkland et al.

(10) Patent No.: US 7,624,303 B2
(45) Date of Patent: Nov. 24, 2009

(54) GENERATION OF SYSTEM POWER-GOOD SIGNAL IN HOT-SWAP POWER CONTROLLERS

(75) Inventors: William Andrew Burkland, Huxley, IA (US); Adolfo A. Garcia, Santa Clara, CA (US)

(73) Assignee: Micrel, Inc., San Jose, CA (US)

( * ) Notice: Subject to any disclaimer, the term of this patent is extended or adjusted under 35 U.S.C. 154(b) by 426 days.

(21) Appl. No.: 11/466,731

(22) Filed: Aug. 23, 2006

(65) Prior Publication Data

US 2008/0048665 A1 Feb. 28, 2008

(51) Int. Cl.
*G06F 11/00* (2006.01)

(52) U.S. Cl. ............... 714/22; 714/14; 714/47; 324/500

(58) Field of Classification Search ........ 714/2, 714/14, 22, 44, 47; 710/301, 302, 304; 324/500
See application file for complete search history.

(56) References Cited

U.S. PATENT DOCUMENTS

| | | | |
|---|---|---|---|
| 6,345,369 B1 * | 2/2002 | Kitamorn et al. ............ 714/14 |
| 6,816,936 B1 * | 11/2004 | Wu et al. ............... 710/302 |
| 7,034,569 B1 * | 4/2006 | Balasubramanian et al. .. 326/38 |
| 7,219,258 B2 * | 5/2007 | LeVangia et al. ............ 714/14 |
| 2005/0240814 A1 * | 10/2005 | Sasakura et al. ............ 714/14 |
| 2006/0133181 A1 * | 6/2006 | Amano ................... 365/229 |
| 2006/0248366 A1 * | 11/2006 | Schumacher et al. ........ 713/323 |

* cited by examiner

*Primary Examiner*—Robert Beausoliel
*Assistant Examiner*—Joseph D Manoskey
(74) *Attorney, Agent, or Firm*—Patent Law Group LLP

(57) ABSTRACT

A power controller system is described herein, which may consist of one or more power controller ICs and other components. Each power controller selectively couples power supply voltages to a plurality of electrical devices, such as cards that have been inserted into expansion slots in a server. To simplify processing by a system processor monitoring the health of the power subsystem, each power controller IC asserts a power-good signal at a power-good terminal only if the operating conditions for all channels are satisfactory. A power good signal is generated even if a channel is not supplying power to a channel due to a card retention switch signal not being asserted or the channel is not enabled. The power-good signals from all power controllers in the system are then ANDed together to determine if any of the power controllers are experiencing unsatisfactory conditions. If the resulting single signal is an asserted power-good signal, then the system knows that all channels in all the power controllers are experiencing satisfactory conditions, even though some channels may not be enabled or there are no modules (e.g., cards) connected to a power controller.

29 Claims, 5 Drawing Sheets

GENERATION OF SYSTEM POWER-GOOD SIGNAL IN HOT-SWAP POWER CONTROLLERS

FIELD OF INVENTION

This invention relates to power controllers for controlling and sensing power to electronic components and, in particular, to the generation of a system power-good signal for use by other circuitry to determine the status of the power subsystem.

BACKGROUND

A hot-swap power controller allows electronic components, such as circuit boards, to be added, removed, or replaced within a system without removing power from other electronic components in the system. An example of the use of a hot-swap power controller is in a server, where expansion cards may be added by inserting the cards into empty slots in the server. The cards have terminals that mate with terminals in the slot. The mated terminals pass information to and from the card as well as supply power to the card. Typical voltages supplied to the slot power terminals are 12 volts and 3.3 volts.

One or more power controller ICs selectively couple the 12 volt and 3.3 volt power supply voltages to the corresponding slot terminals based on whether certain conditions are met. For example, the power supply voltages should only be applied, or continue to be applied, to the slot terminals if: 1) there is a card inserted into the slot; 2) the supply voltages are at their proper levels; and 3) there is no fault condition, such as an over-current. Other conditions may apply.

Once the above conditions are met, the power controller IC couples power to the card and, in some cases, generates a "power-good" signal for application to a system processor that is used to convey that the output power to the card is satisfactory. The power-good signal indicates to the system processor that it is now okay to communicate with the card since it is powered up.

If the power controller is not enabled by the system processor, the power controller will issue a "power not good" signal, which is a deasserted power-good signal. Further, if a card is not inserted into an expansion slot, the power controller for that slot will not provide power to that slot, and will output a deasserted power-good signal. A deasserted power-good signal may also be a result of an overcurrent condition, an input undervoltage, or an over-temperature condition that caused the power controller to shut off power to the card or other equipment. Therefore, detecting a deasserted power-good signal on the power-good terminal of the power controller does not indicate whether or not the power is not good due to problems with the system.

In a hot-swap system, each power controller typically controls power to only a few devices, each device being associated with a separate channel of the power controller. The power controller must separately control the power to each replaceable module and detect the power status of each individual replaceable module. Some systems include many replaceable modules or the capability of using many replaceable modules, such as a server that has expansion slots for receiving hot-swap expansion cards. Therefore, a single system may have many power controllers IC, each operating independently and providing their own sets of status and power-good signals to one or more system processors. The system must figure out, from all the independent signals, whether the system is healthy and how to react to any flags indicating that the system is not healthy.

Designers of such systems find it complex and difficult to deal with all the signals generated by the various power controller ICs. The above problems are also applicable in many other situations not relating to cards in a slot.

It is desirable to simplify the determination in an electronic system incorporating power controllers that the power subsystem is operating satisfactorily.

SUMMARY

A power controller system is described herein, which may consist of one or more power controller ICs and other components. Each power controller selectively couples power supply voltages to electrical equipment, such as a card that has been inserted into an expansion slot in a server. Each power controller supplies status signals to a system processor or other housekeeping processor.

To simplify the determination by the system processor that the power subsystem is operating satisfactorily, each power controller IC asserts a system power-good signal (referred to herein as a SYSPWRGD signal) at a SYSPWRGD terminal reflecting that no unsatisfactory conditions in any channel are sensed. Only the voltage levels and other conditions for enabled channels that are providing power to installed cards (or other installed equipment) are sensed. Accordingly, even if some channels are not supplying power due to proper operation, the SYSPWRGD signal will still be asserted for each power controller.

The SYSPWRGD signals from all power controllers in the system are then ANDed together to determine if any of the power controllers are experiencing an unsatisfactory condition. If the resulting overall SYSPWRGD signal is asserted, then the system knows that the power subsystem is experiencing satisfactory conditions, even though some channels may not be enabled or there are no modules (e.g., cards) connected to a power controller.

A logic circuit is described that receives various inputs to and from multiple power controllers and outputs a single asserted or deasserted overall SYSPWRGD signal to convey to the system processor (e.g., a processor that monitors the health of the system) the health of the power subsystem. If the SYSPWRGD signal is deasserted, the system processor will typically identify to the user by a flag that there is a problem. The user may then perform diagnostics to discover the source of the problem.

DETAILED DESCRIPTION

Figure 1:
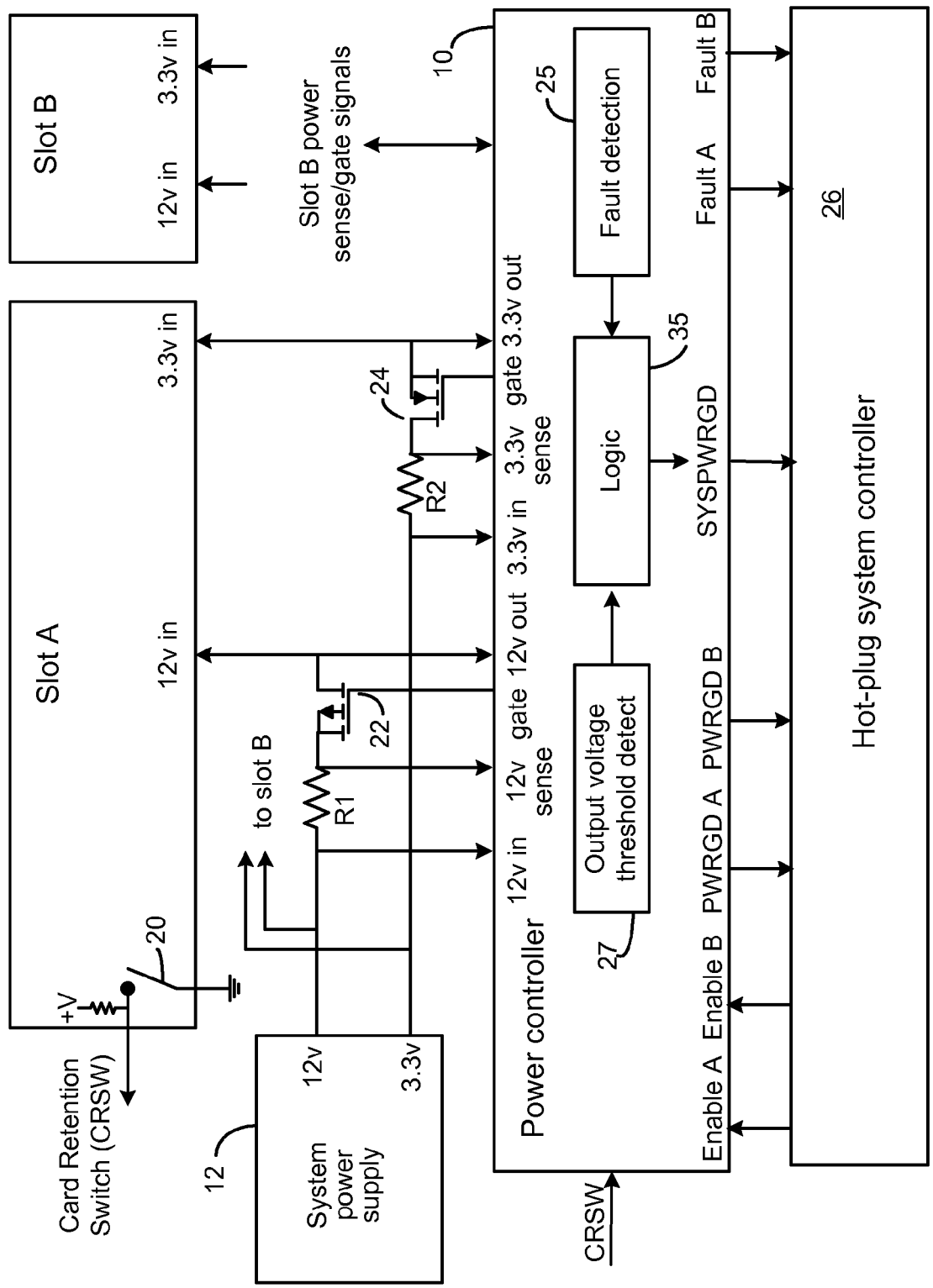
FIG. 1 illustrates a power controller controlling power to two slots in an expandable server or other equipment in accordance with one embodiment of the invention.

FIG. 1 illustrates a power controller 10 controlling power from a system power supply 12 to power terminals in two slots (A and B) in a server or other equipment. The controller 10 may be a single integrated circuit (IC). In the example described herein, the controller 10 is used as a dual-slot power controller supporting the power distribution requirements for Peripheral Component Interconnect Express (PCI Express) Hot-Plug compliant systems. The power controller 10 provides power control support for two PCI Express slots, requiring 12 volt and 3.3 volt power. Although the PCI Express standards also call for an auxiliary 3.3 volt supply, the circuitry for supplying this auxiliary power is not described herein since it is unnecessary for a full understanding of the invention.

Figure 2:
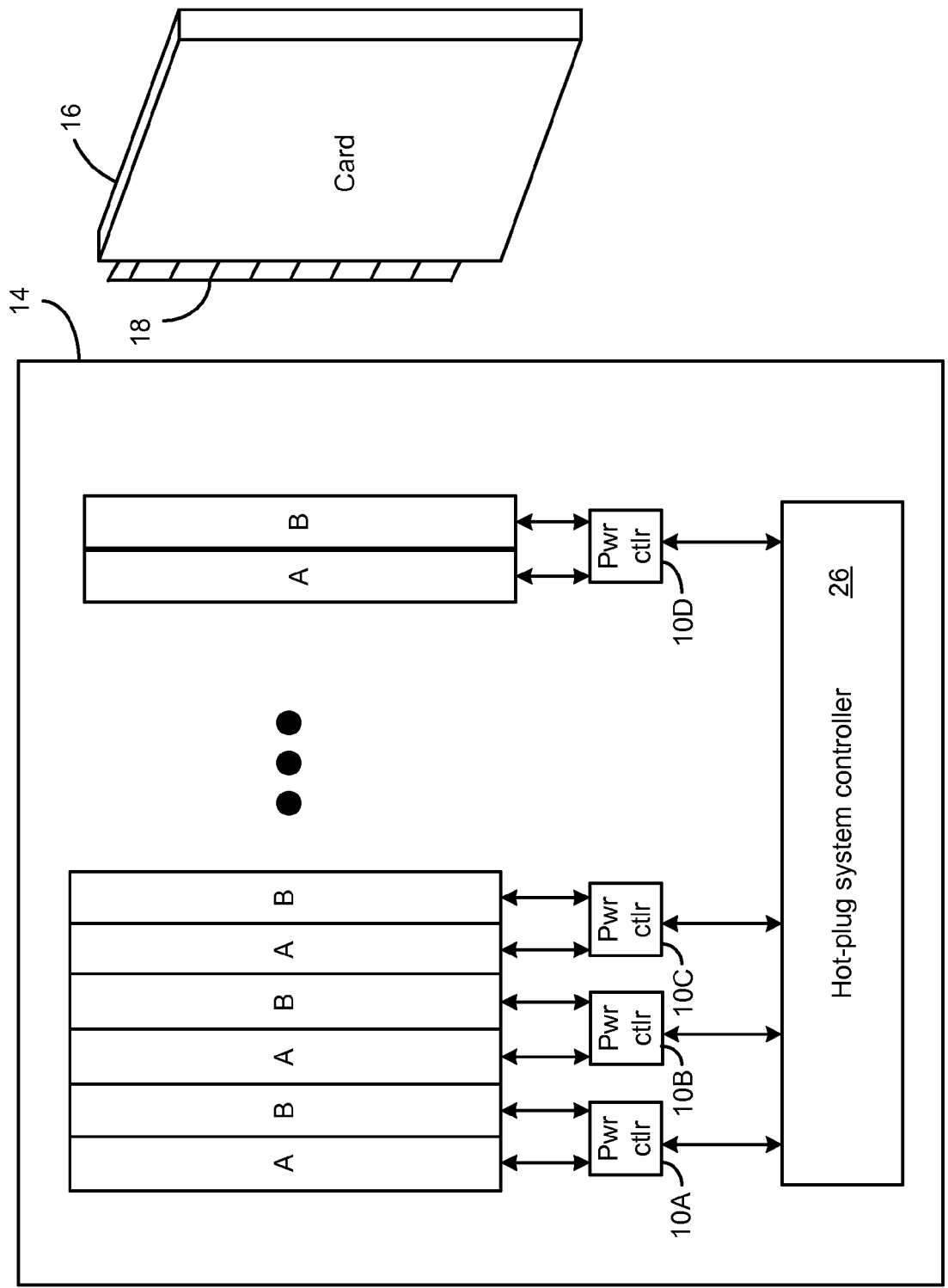
FIG. 2 illustrates many dual-slot power controllers connected to slots in an expandable server or other equipment in accordance with one embodiment of the invention.

FIG. 2 illustrates how a separate power controller 10A-10D controls power to two slots A and B in a server 14. An expansion card 16, containing a printed circuit board and circuitry for operation of the server 14, is inserted into a slot when necessary for expanding the capability of the server. Accordingly, the slots are referred to as expansion slots. The cards 16 have metal terminals 18 that mate with corresponding terminals in a slot for coupling power to the card 16 and for interfacing with the server/system processor. The cards 16 may be removed or inserted while the server 14 is operating, without affecting the cards in the other slots. This is referred to a hot-swapping.

In the described example, power is automatically applied to the associated 12 volt and 3.3 volt power terminals of the slot only when it is detected that a card 16 has been inserted into the slot and other conditions, described below, are met.

Referring back to FIG. 1, each slot includes a microswitch or other sensor (both generically referred to as a card retention switch) that is triggered by the card 16 being inserted into a slot. FIG. 1 shows a card retention switch (CRSW) 20 that is physically pushed closed by the action of the card 16 being inserted into slot A or by card retainer clips being secured. The closing of switch 20 causes a CRSW signal to go from a logical high to a logical low to signal to the power controller 10 that MOSFETs 22 and 24 should be closed to apply the 12 volt and 3.3 volt power to the slot if all other required conditions (e.g., an adequate power supply voltage) are met.

The controller 10 detects, for the 12 volt and 3.3 volt paths, at least the following: the input voltage from the power supply 12, a sense voltage whose value is a product of the current through a sense resistor R1 or R2, and the voltage actually applied to the slot terminal.

An over-current through the sense resistor R1 or R2 is detected by applying the input voltage (12v in or 3.3v in) from the power supply 12, minus an offset voltage, to one input of a hysteretic comparator. The other input of the hysteretic comparator is connected to the sense voltage (12v sense or 3.3v sense). If the sense voltage drops below a threshold, the comparator triggers to indicate an over-current condition, and a fault signal is generated for that slot. The fault detection circuitry is shown in FIG. 1 as fault detection circuit 25, which receives the various sense signals and determines overcurrent, overtemperature, and other appropriate fault conditions. Such fault circuitry is well known.

The controller 10 also compares the 12v and 3.3v voltages from the power supply 12 to a minimum threshold to determine if there is an undervoltage condition. Such circuitry is well known. If an undervoltage is detected, an undervoltage lockout (UVLO) signal is generated, causing a fault signal to be generated for that slot. Fault flags are output at the FAULT A and FAULT B terminals.

A hot-plug system controller 26 shown in FIGS. 1 and 2 represents any system processor that receives signals from the power controller 10 and controls other aspects of the system based on those signals. The hot-plug system controller 26 may be a system processor for the server or other device. The hot-plug system controller 26 generates an enable signal for each slot (enable A or B) to enable or disable any channel or reset the fault logic circuitry in the power controller 10 after a fault condition has been fixed. The enable signal may be toggled by the system for any reason to decouple power from the slots, such as a shut down of the system.

If the CRSW signal indicates a card 16 is in the slot, and there are no fault signals, and the power controller 10 is enabled for that slot, then the power controller 10 closes or keeps closed the MOSFETs 22 and 24 for the associated slot.

The circuitry shown in FIG. 1 also exists for the slot B, but the circuitry for slot B is not shown for simplicity.

A power-good (PWRGD) signal is generated by each power controller IC for each associated slot A and B. The PWRGD A and PWRGD B terminals are shown in FIG. 1 and are applied to the hot-plug system controller 26. A logical 0 PWRGD signal indicates that the output voltage applied to the slot is above the threshold and there is no fault associated with that slot. This logical 0 state of the PWRGD signal is referred to as being an asserted PWRGD signal. A logical 1 PWRGD signal indicates that either the output voltage applied to the slot is below the threshold or that there is a fault associated with that slot. This logical 1 state of the PWRGD signal is referred to as being a deasserted PWRGD signal. The logic level associated with an asserted or deasserted signal may also be the opposite.

The determination of whether the output voltage to the slot is above the threshold is determined by the output voltage detect circuit 27, which compares the 12 v out and 3.3 v out voltages to threshold voltages, using a comparator.

Upon powering up of the card or other equipment, after the MOSFETs 22 and 24 have been turned on, the externally outputted PWRGD A or B signal state is determined by the logical ANDing of the power-good indicators (no undervoltage, no overcurrent, no overtemperature, etc.) and the enable signal that enables the channel.

Upon powering down of the card or other equipment, the deassertion of the PWRGD A or B signal corresponds with the MOSFETs 22 and 24 being switched off.

The PWRGD A and B signals are output from the power controller 10 and applied to an external processor (e.g., the hot-plug system controller 26 in FIG. 1) so that the external processor knows the state of the power for that particular channel and can used the signal for any purpose applicable to the system when the slot is powering up or down. For example, the asserted PWRGD A or B signal may be used by the external system to determine that it is okay to begin communicating with the card in the slot.

Although the PWRGD A and PWRGD B signals indicate when a particular slot is properly powered up, it would be beneficial for the system processor (or other housekeeping processor) to also know the overall status of the power subsystem, including all power controllers in the system, for "power housekeeping." A simple high or low signal indicating the overall status of the entire power subsystem could be used by the system or housekeeping processor (both will be subsequently referred to as the system processor) to easily determine whether the power subsystem is operating satisfactorily. If such a simple signal were not made available, the designer of the system would have to develop software or logic circuitry to detect status signals for each slot for each power controller, as well as other applicable signals, to determine if the overall status of the power subsystem is good. Such detection would be complex and add cost to the system.

Figure 3:
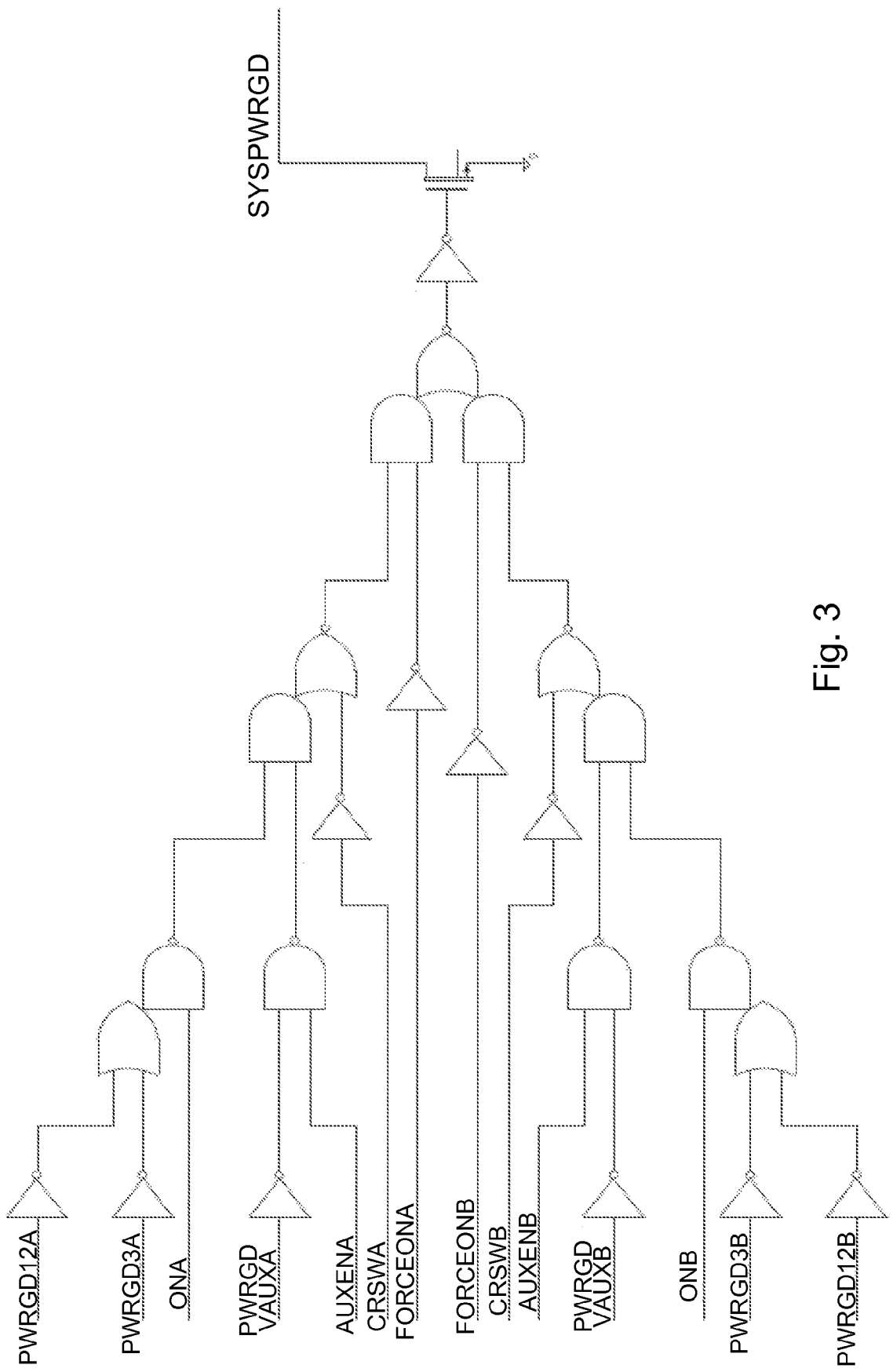
FIG. 3 illustrates a logic circuit in each power controller IC of FIG. 2 that receives various status signals and outputs a single SYSPWRGD signal.

FIG. 3 is a logic circuit internal to a single power controller 10 that generates a system power-good signal (SYSPWRGD) for each power controller IC that indicates whether the overall power provided by that power controller IC is good for all of its channels, even when one or more channels are not enabled, or cards are not installed in the slots, or the controller is in a diagnostic state that overrides certain protections. In other words, the SYSPWRGD signal is asserted even when there is no power provided to certain channels, as long as the inadequate power is not a result of any fault in a channel. This SYSPWRGD output terminal is shown in FIG. 1. The logic circuit 35 in FIG. 1 outputting the SYSPWRGD signal contains the circuitry of FIG. 3 along with additional logic that generates the various PWRGD signals, including the PWRGDA and PWRGDB signals in FIG. 1. Implementation of such logic would be well known to those skilled in the art.

The logic circuit of FIG. 3 receives various internal status signals and, if the states are of the proper levels indicating that there is no undesirable condition, the logic circuit asserts the SYSPWRGD signal. If the status signals indicate that there is an undesirable condition, then the logic circuit deasserts the SYSPWRGD signal.

In the embodiment of FIG. 3, the input status signals are as follows. Separate PWRGD signals for the 12 volt, 3.3 volt, and auxiliary 3.3 volt outputs for channels A and B are received, indicating whether the 12 volt, 3.3 volt, and auxiliary power output for those channels are above a threshold voltage. The PWRGD12A, PWRGD3A, PWRGDVAUXA, PWRGDVAUXB, PWRGD3B, and PWRGD12B signals shown in FIG. 3 are generated internal to the controller 10 and are not the PWRGD A and PWRGD B signals of FIG. 1 output by the power controller 10 to the hot-plug system controller 26. The PWRGD12A, PWRGD3A, PWRGDVAUXA, PWRGDVAUXB, PWRGD3B, and PWRGD12B signals only reflect whether the output voltage for the associated voltage and channel is above the threshold. Enable signals (ONA, ONB, AUXENA, and AUXENB) are received indicating whether the system has enabled the main or auxiliary power for each channel. Card retention switch signals (CRSWA and CRSWB) are received to determine if a card (or any other type of electronic equipment) has been connected to the power output terminals of a channel. Force On enable signals (FORCEONA and FORCEONB) are received, which are used for diagnostic purposes only and turn on all three of the outputs (12v, 3.3v main, and 3.3v aux) while defeating all protections on those channels.

The SYSPWRGD signal is low, meaning there is a problem in the power controller output power to any one of the channels, when any of the following conditions occur:

1) CRSWA is high (card in slot A); and ONA is high (channel/slot A is enabled); and FORCEONA is low (the FORCE diagnostic operation is off); and either the PWRGD12A or PWRGD3A signals are low, indicating that a fault in the main 12v or 3.3v paths in channel A is detected in channel A or either the main 12v or 3.3v output in channel A is below its threshold; or 2) CRSWB is high (card in slot B); and ONB is high (channel/slot B is enabled); and FORCEONB is low (the FORCE diagnostic operation is off); and either the PWRGD12B or PWRGD3B signals are low, indicating that a fault in the main 12v or 3.3v paths in channel B is detected or either the main 12v or 3.3v output in channel B voltage is below its threshold; or 3) CRSWA is high (card in slot A); and AUXENA is high (aux voltage for channel/slot A is enabled); and FORCEONA is low (the FORCE diagnostic operation is off); and the VAUXA (aux 3.3 volt power output for channel A) signal is low, indicating that a fault in the aux 3.3 v path in channel A is detected or the auxiliary voltage output is below its threshold; or 4) CRSWB is high (card in slot B); and AUXENB is high (aux voltage for channel/slot B is enabled); and FORCEONB is low (the FORCE diagnostic operation is off); and the VAUXB (aux 3.3 volt power output for channel B) signal is low, indicating that a fault in the aux 3.3v path in channel B is detected or the auxiliary voltage output is below its threshold.

The SYSPWRGD signal is an open drain "high" signal for all other times. Since the output of the SYSPWRGD terminal is the drain of an N-MOSFET, the output is ground when SYSPWRGD is low and an open circuit when SYSPWRGD is high.

Figure 4:
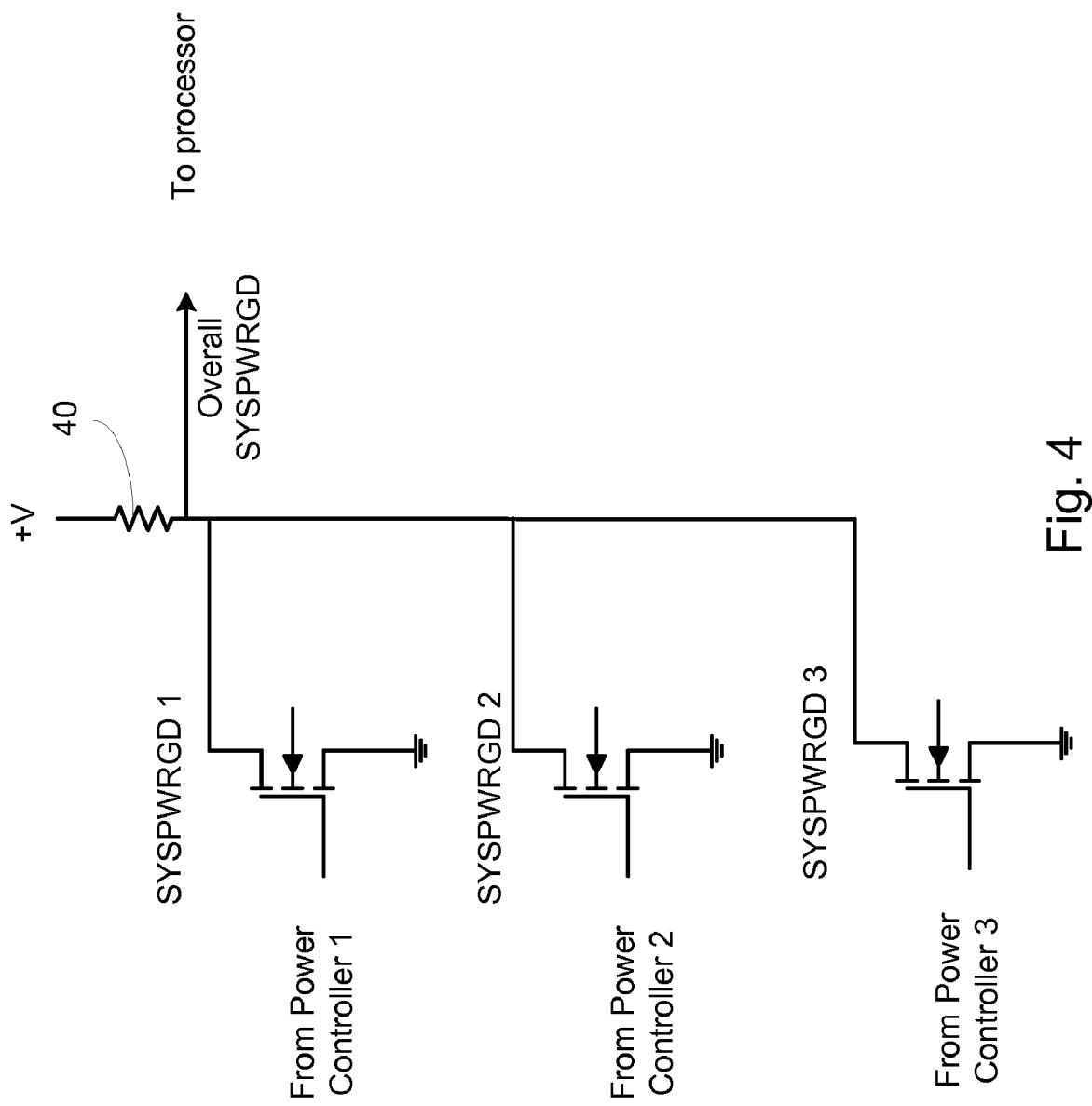
FIG. 4 illustrates a logic circuit that receives as inputs all the SYSPWRGD signals from the various power controller ICs and provides a single overall SYSPWRGD signal that is asserted only if all the power controller ICs generated an asserted SYSPWRGD signal.

To develop a single high/low signal to determine the health of all power controller conditions in the system, the connection shown in FIG. 4 may be used. FIG. 4 shows the output MOSFETs for three power controllers, although many more power controllers may be connected. Each MOSFET is the MOSFET shown in FIG. 3 internal to each power controller. All the SYSPWRGD signals from the various power controllers are connected together on a bus to a pull up resistor 40. If all the MOSFETs are off, meaning that the power status is good for all the power controllers, then the overall SYSPWRGD signal will be high. If any one of the SYSPWRGD signals from the power controllers is low, the overall SYSPWRGD signal will be low. The connection of FIG. 4 is equivalent to an AND gate, where all input signals must be a logical high in order for the output to be high.

The overall SYSPWRGD signal is received by a system processor (such as the hot-plug system controller 26 in FIG. 2) and is used by the system processor to determine if the power subsystem is operating normally. If the overall SYSPWRGD signal indicated a problem, then the system processor will create a flag, notifying the user of a problem. A routine may then be performed to identify the particular channel having the problem. A faulty card in a slot may then be replaced or other remedial action taken.

Many other types of equivalent logic circuits may also be used instead of the logic of FIGS. 3 and 4. The various logic signal levels may be the opposite of those described above.

Although the embodiments described couple two or more different power supply voltages to corresponding inputs of two or more slots, the invention is equally applicable to a power controller that couples one voltage to a single slot. Such a power controller that couples one voltage to a single slot would still output a SYSPWRGD signal indicating that the operating conditions are satisfactory, where the SYSPWRGD signal may be ANDed with other SYSPWRGD signals as shown in FIG. 4.

Figure 5:
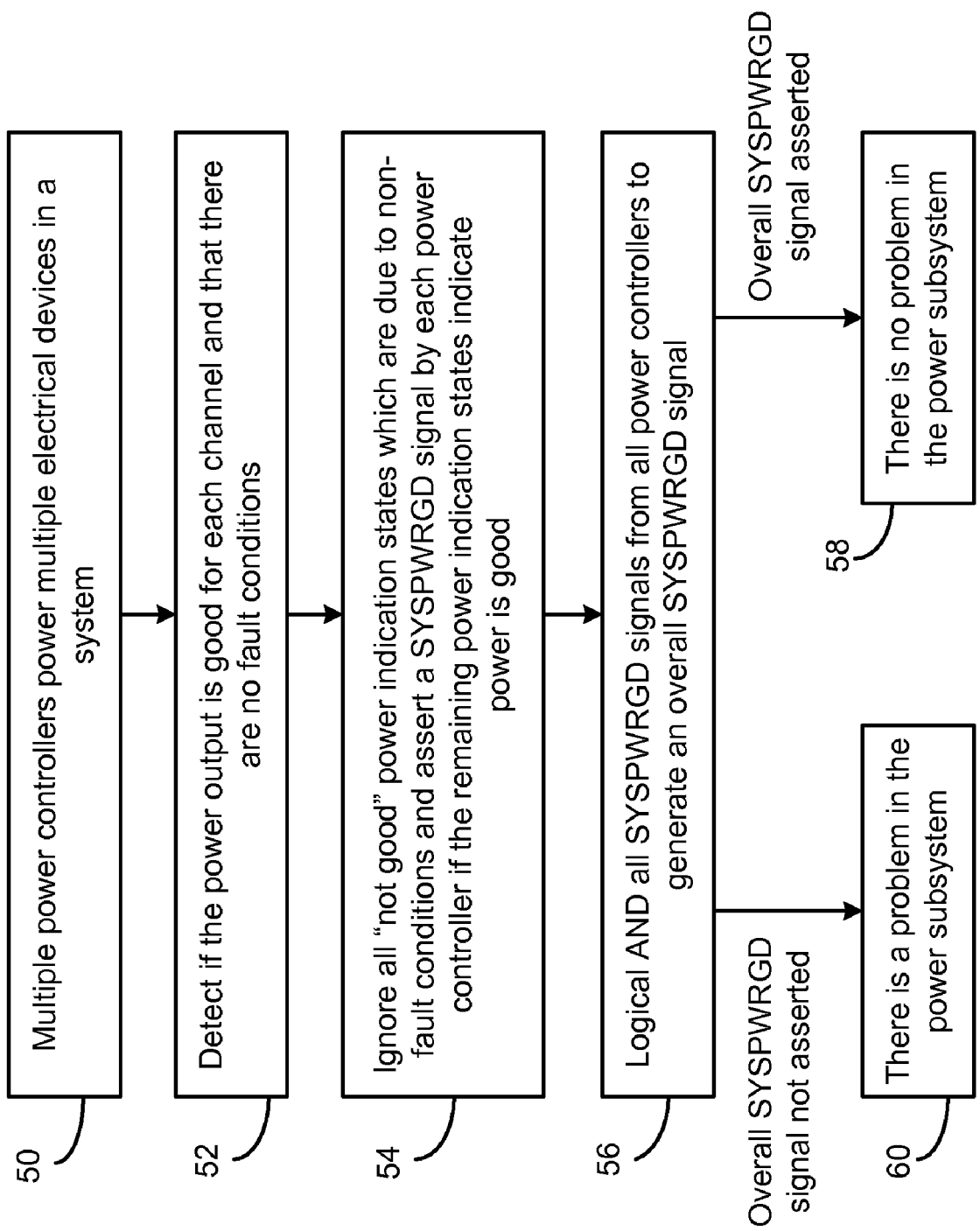
FIG. 5 is a flowchart identifying the steps performed in one embodiment of the invention.

FIG. 5 is a flow chart illustrating various steps in generating the overall SYSPWRGD signal to allow a system processor to determine the health of the power subsystem.

In step 50, multiple power controller ICs are connected in a system, where each power controller is connected to control power to one or more electrical devices, such as slots for expansion cards, the expansion cards themselves, or other electrical equipment.

In step 52, each power controller detects whether the output power is good for each channel output and that there are no fault conditions. Good output power may not be detected for some channels because there is no card installed, or the channel is not enabled, or there is diagnostic testing occurring. Therefore, even if there is normal operation, the output power may be detected as being not good.

In step 54, logic in each power controller IC is used to ignore all "not-good" power indication states which are due to non-fault conditions (e.g., channel disabled, no card installed, etc.) and asserts a system power-good (SYSPWRGD) signal if the power controller is experiencing satisfactory operating conditions.

In step 56, all the SYSPWRGD signals from all the power controller ICs are logically ANDed together to generate an overall SYSPWRGD signal.

In step 58, an asserted overall SYSPWRGD signal indicates that the entire power subsystem is operating properly and there are no faults that need remedial action. In step 60, a deasserted overall SYSPWRGD signal indicates that there is a problem somewhere in the power subsystem that needs remedial action.

Having described the invention in detail, those skilled in the art will appreciate that given the present disclosure, modifications may be made to the invention without departing from the spirit and inventive concepts described herein. Therefore, it is not intended that the scope of the invention be limited to the specific embodiments illustrated and described.

What is claimed is:

1. A power control system comprising:
    a first power controller comprising:
        a first control terminal for connection to a first switch for selectively coupling a power supply voltage to a first electrical device;
        first fault detection circuitry for receiving a sense signal indicating any fault in delivery of the power supply voltage to the first electrical device, the fault detection circuitry generating at least one fault indication signal indicating whether there is a first fault condition;
        first circuitry for detecting a level of voltage provided to the first electrical device and generating a first signal, a first state of the first signal indicating that power to the first electrical device is satisfactory, a second state of the first signal indicating that power to the first electrical device is unsatisfactory;
        first logic circuitry receiving the first signal, the at least one fault indication signal, and at least one other first status signal, wherein the at least one other first status signal is processed by the first logic circuitry to determine whether the second state of the first signal is a result of other than the first fault condition; and
        a first output terminal connected to an output of the first logic circuitry,
            the first output terminal providing a first power-good signal having a first state that indicates that conditions of the first power controller are unsatisfactory, wherein the first logic circuitry is configured to output the first state of the first power-good signal at least if the second state of the first signal is due to the at least one fault indication signal indicating that there is a first fault condition, and wherein the first logic circuitry is configured such that the second state of the first signal does not force the first state of the first power-good signal to occur if the second state of the first signal is a result of other than the first fault condition,
            the first output terminal providing the first power-good signal having a second state that indicates that conditions of the first power controller are satisfactory, wherein the first logic circuitry is configured such that the second state of the first signal does not affect the state of the first power-good signal if the logic circuitry determines that the second state of the first signal is a result of other than the first fault condition,
            the first output terminal for connection to circuitry external to the first power controller.

2. The system of claim 1 wherein the at least one other first status signal is an enable signal that enables or disables at least a portion of the first power controller.

3. The system of claim 1 wherein the at least one other first status signal is a signal indicating whether electrical equipment is installed to received power controlled by the first power controller.

4. The system of claim 1 wherein the first electrical device comprises a slot for receiving a circuit card.

5. The system of claim 1 wherein the first electrical device comprises at least one circuit card.

6. The system of claim 1 wherein the first power controller is a single integrated circuit.

7. The system of claim 1 further comprising third circuitry connected to the first output terminal and connected to other output terminals of other power controllers, the third circuitry generating an overall system power-good signal having a first state that indicates that all power controllers are experiencing satisfactory conditions and having a second state that indicates that at least one power controller is experiencing an unsatisfactory condition.

8. The system of claim 1, wherein the first output terminal is connected to a processor for monitoring a status of a power subsystem.

9. The system of claim 1 wherein the first fault detection circuitry comprises overcurrent and undervoltage detection circuitry.

10. The system of claim 1 wherein the at least one other first status signal comprises a retention switch signal that is asserted when the first electrical device is installed in a receiving station, the retention switch signal being received by the first power controller causing the control terminal to output a control signal to couple the power supply voltage to the first electrical device.

11. The system of claim 10 wherein the first electrical device is a card and the receiving station is a slot into which a card is inserted, the slot having one or more terminals that receive the power supply voltage when a control signal output by the control terminal causes the power supply voltage to be coupled to a card.

12. The system of claim 1 wherein the first power controller controls multiple voltages to the first electrical device, each voltage being coupled to the first electrical device by a separate switch connected to an associated control terminal of the first power controller.

13. The system of claim 12 wherein the multiple voltages comprise 12 volts and 3.3 volts.

14. The system of claim 1 wherein the first power controller further comprises:
    a plurality of control terminals for connection to a plurality of switches for selectively coupling at least one power supply voltage to a plurality of electrical devices connected to different channels of the first power controller,
    wherein the first output terminal connected to the output of the first logic circuitry provides a first power-good signal having a first state that indicates that conditions of the first power controller for any one of the channels are unsatisfactory and a second state that indicates that conditions of the first power controller for all the channels are satisfactory.

15. The system of claim 1 wherein the first power controller is a hot-swap power controller, wherein the first electrical device is removed or installed without shutting down other electrical devices in the system.

16. The system of claim 1 further comprising:
    a second power controller comprising:
        a second control terminal for connection to a second switch for selectively coupling a power supply voltage to a second electrical device;
        second fault detection circuitry for receiving a sense signal indicating any fault in delivery of the power supply voltage to the second electrical device, the second fault detection circuitry generating at least one second fault indication signal indicating whether there is a second fault condition;

second circuitry for detecting a level of voltage provided to the second electrical device and generating a second signal, a first state of the second signal indicating that power to the second electrical device is satisfactory, a second state of the second signal indicating that power to the second electrical device is unsatisfactory;

second logic circuitry receiving the second signal, the at least one second fault indication signal, and at least one other second status signal, where the at least one other second status signal is processed by the second logic circuitry to determine whether the second state of the second signal is a result of other than a second fault condition; and a second output terminal connected to an output of the second logic circuitry, the second output terminal providing a second power-good signal having a first state that indicates that conditions of the second power controller are unsatisfactory and a second state that indicates that conditions of the second power controller are satisfactory, the second output terminal for connection to circuitry external to the second power controller.

17. The system of claim 16 further comprising third circuitry connected to the first output terminal, the second output terminal, and any output terminals of additional power controllers in the system, the third circuitry generating an overall system power-good signal having a first state that indicates that the first power controller, the second power controller, and any additional power controllers are experiencing satisfactory conditions and having a second state that indicates that at least one power controller is experiencing an unsatisfactory condition.

18. The system of claim 1 wherein the second state of the first power good signal is generated upon at least the following conditions being met: a card retention switch signal indicating that a circuit card has been installed in a slot connected to receive the power supply voltage controlled by the first power controller; an enable signal indicating that the first power controller is enabled to provide power to the circuit card; and all power supply voltages supplied to the circuit card are above a threshold voltage.

19. The system of claim 1 wherein a first power good signal is provided for each voltage controlled by the first power controller.

20. A method of operating a power controller system comprising:

generating a control signal by a first power controller at a first control terminal connected to a first switch that selectively couples a power supply voltage to a first electrical device and uncouples the power supply voltage from the first electrical device;

receiving, by first fault detection circuitry, a sense signal for indicating any fault in delivery of the power supply voltage to the first electrical device, the fault detection circuitry generating at least one fault indication signal indicating whether there is a first fault condition;

detecting, by first circuitry, a level of voltage provided to the first electrical device and generating a first signal, a first state of the first signal indicating that power to the first electrical device is satisfactory, a second state of the first signal indicating that power to the first electrical device is unsatisfactory;

receiving, by first logic circuitry, the first signal, the at least one fault indication signal, and at least one other first status signal, wherein the at least one other first status signal is processed by the first logic circuitry to determine whether the second state of the first signal is a result of other than a first fault condition; and providing, by a first output terminal connected to an output of the first logic circuitry, a first power-good signal having a first state that indicates that conditions of the first power controller are unsatisfactory, wherein the first logic circuitry is configured to output the first state of the first power-good signal at least if the second state of the first signal is due to the at least one fault indication signal indicating that there is a first fault condition, and wherein the first logic circuitry is configured such that the second state of the first signal does not force the first state of the first power-good signal to occur if the second state of the first signal is a result of other than the first fault condition, the first output terminal providing the first power-good signal having a second state that indicates that conditions of the first power controller are satisfactory, wherein the first logic circuitry is configured such that the second state of the first signal does not affect the state of the first power-good signal if the logic circuitry determines that the second state of the first signal is a result of other than the first fault condition, the first power-good signal being supplied to circuitry external to the first power controller.

21. The method of claim 20 wherein the at least one other first status signal is an enable signal that enables or disables at least a portion of the first power controller.

22. The method of claim 20 wherein the at least one other first status signal is a signal indicating whether electrical equipment is installed to received power controlled by the first power controller.

23. The method of claim 20 wherein the circuitry external to the first power controller is a processor, the method further comprising the processor monitoring a status of a power subsystem.

24. The method of claim 20 wherein the first fault detection circuitry comprises overcurrent and undervoltage detection circuitry.

25. The method of claim 20 wherein the at least one other first status signal comprises a retention switch signal that is asserted when the first electrical device is installed in a receiving station, the method further comprising receiving the retention switch signal by the first power controller to cause the control terminal to output a control signal to couple the power supply voltage to the first electrical device.

26. The method of claim 20 wherein the first power controller controls multiple voltages to the first electrical device, each voltage being coupled to the first electrical device by a separate switch connected to an associated control terminal of the first power controller.

27. The method of claim 20 further comprising:

generating control signals at a plurality of control terminals for controlling a plurality of switches for selectively coupling at least one power supply voltage to a plurality of electrical devices connected to different channels of the first power controller, wherein the first output terminal connected to the output of the first logic circuitry provides a first power-good signal having a first state that indicates that conditions of the first power controller for any one of the channels are unsatisfactory and a second state that indicates that conditions of the first power controller for all the channels are satisfactory.

28. The method of claim 20 wherein the second state of the first power good signal is generated upon at least the following conditions being met: a card retention switch signal indicating that a circuit card has been installed in a slot connected to receive the power supply voltage controlled by the first power controller; an enable signal indicating that the first power controller is enabled to provide power to the circuit card; and all power supply voltages supplied to the circuit card are above a threshold voltage.

29. The method of claim 20 wherein a first power good signal is provided for each voltage controlled by the first power controller.

* * * * *